(12) United States Patent
Hayashi et al.

(10) Patent No.: US 6,634,948 B1
(45) Date of Patent: Oct. 21, 2003

(54) GAME SYSTEM AND INFORMATION STORAGE MEDIUM

(75) Inventors: Atsushi Hayashi, Yokohama (JP); Takashi Satsukawa, Yokohama (JP)

(73) Assignee: Namco Ltd., Tokyo (JP)

( * ) Notice: Subject to any disclaimer, the term of this patent is extended or adjusted under 35 U.S.C. 154(b) by 442 days.

(21) Appl. No.: 09/208,430

(22) Filed: Dec. 10, 1998

(30) Foreign Application Priority Data

Dec. 12, 1997 (JP) .............................................. 9-362839

(51) Int. Cl.[7] .................................................. A63F 9/22
(52) U.S. Cl. .............................. 463/42; 463/40; 463/43
(58) Field of Search ............................... 463/2, 42, 49, 463/51, 41–43

(56) References Cited

U.S. PATENT DOCUMENTS

| | | | | |
|---|---|---|---|---|
| 3,960,380 A | * | 6/1976 | Yokoi ....................... | 273/101.1 |
| 4,192,507 A | * | 3/1980 | Rains et al. ................. | 273/311 |
| 4,232,865 A | * | 11/1980 | Chen et al. .................. | 273/311 |
| 4,572,509 A | * | 2/1986 | Sitrick ....................... | 273/85 G |
| 4,738,451 A | * | 4/1988 | Logg ........................ | 273/153 R |
| 4,958,835 A | * | 9/1990 | Tashiro et al. ............. | 273/85 G |
| 4,998,199 A | * | 3/1991 | Tashiro et al. .............. | 364/410 |
| 5,816,920 A | * | 10/1998 | Hanai ........................... | 463/42 |
| 5,853,324 A | * | 12/1998 | Kami et al. ..................... | 463/2 |
| 5,922,053 A | * | 7/1999 | Okada ......................... | 709/238 |

FOREIGN PATENT DOCUMENTS

| | | | |
|---|---|---|---|
| EP | 0 872 266 A1 | | 10/1998 |
| GB | 2 318 065 A | * | 4/1998 |
| JP | A-8-155142 | * | 6/1996 |
| JP | A-8-303997 | * | 11/1996 |
| JP | A-9-75552 | * | 3/1997 |
| JP | A-9-166417 | * | 6/1997 |
| JP | A-9-313737 | * | 12/1997 |
| JP | A-9-313738 | * | 12/1997 |

OTHER PUBLICATIONS

Gemstone III Homepage (http://www.play.ney/simunet_public/corporate/gs3home.asp)—pp. 1& 2.
Gemstone III Playing Documentation (http://www.play.ney/simunet_public/corporate/gs3home.asp)—pp. 1–18.
The Adrenaline Vault Review of Ultima Online (http://www.avault.com/reviews/review_temp.asp?game=uo&page=1)—pp. 1–3.
The Adrenaline Vault Review of Ultima Online (http://www.avault.com/reviews/review_temp.asp?game=uo&page=2)—pp. 1–3.
The Adrenaline Vault Review of Ultima Online (http://www.avault.com/reviews/review_temp.asp?game=uo&page=3)—pp. 1–4.
The Adrenaline Vault Review of Ultima Online (http://www.avault.com/reviews/review_temp.asp?game=uo&page=4)—pp. 1–2.

* cited by examiner

*Primary Examiner*—S. Thomas Hughes
*Assistant Examiner*—Carmen D. White
(74) *Attorney, Agent, or Firm*—Oliff & Berridge, PLC

(57) ABSTRACT

The objective is to provide a game system and an information storage medium that enable another player to enter into a game space that a first player is playing in, at any time during the game. When a 2P player issues a request to join into a game within a first game space, while a 1P player is already playing the game in the first game space, that request is accepted. Reconstruction information for reconstructing the first game space is created and sent to a second game machine. The second game machine reconstructs the first game space based on this reconstruction information, so that the 2P player can play the game within the reconstructed game space. This enables the 2P player to join into a game within the first game space, at any time during the game.

16 Claims, 17 Drawing Sheets

FIRST DISPLAY SCREEN        SECOND DISPLAY SCREEN

GAME PROGRESS POINT 2 START

FIRST DISPLAY SCREEN    SECOND DISPLAY SCREEN 60-2    GAME PROGRESS POINT 5 START    60-1

"ACTION!"

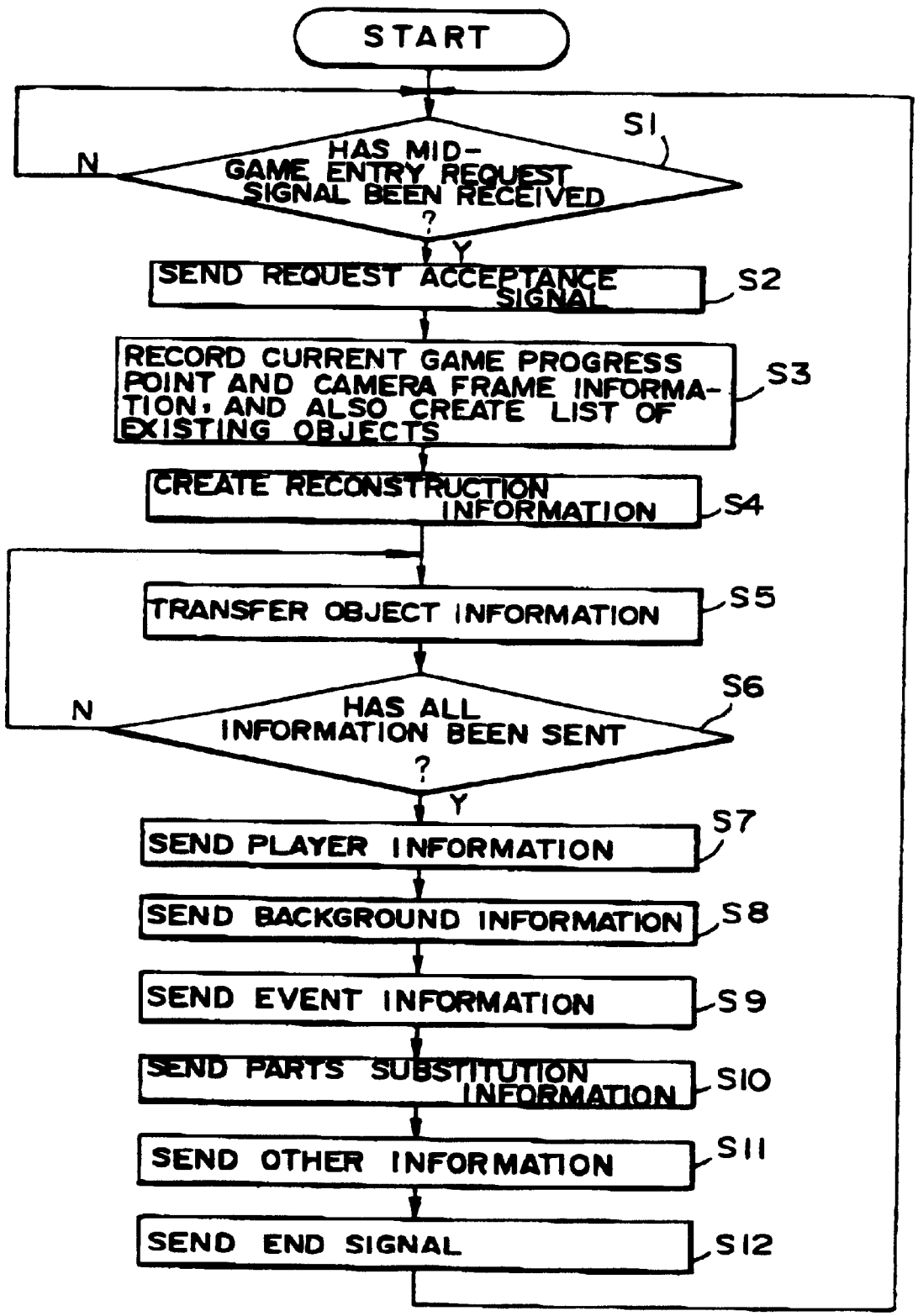

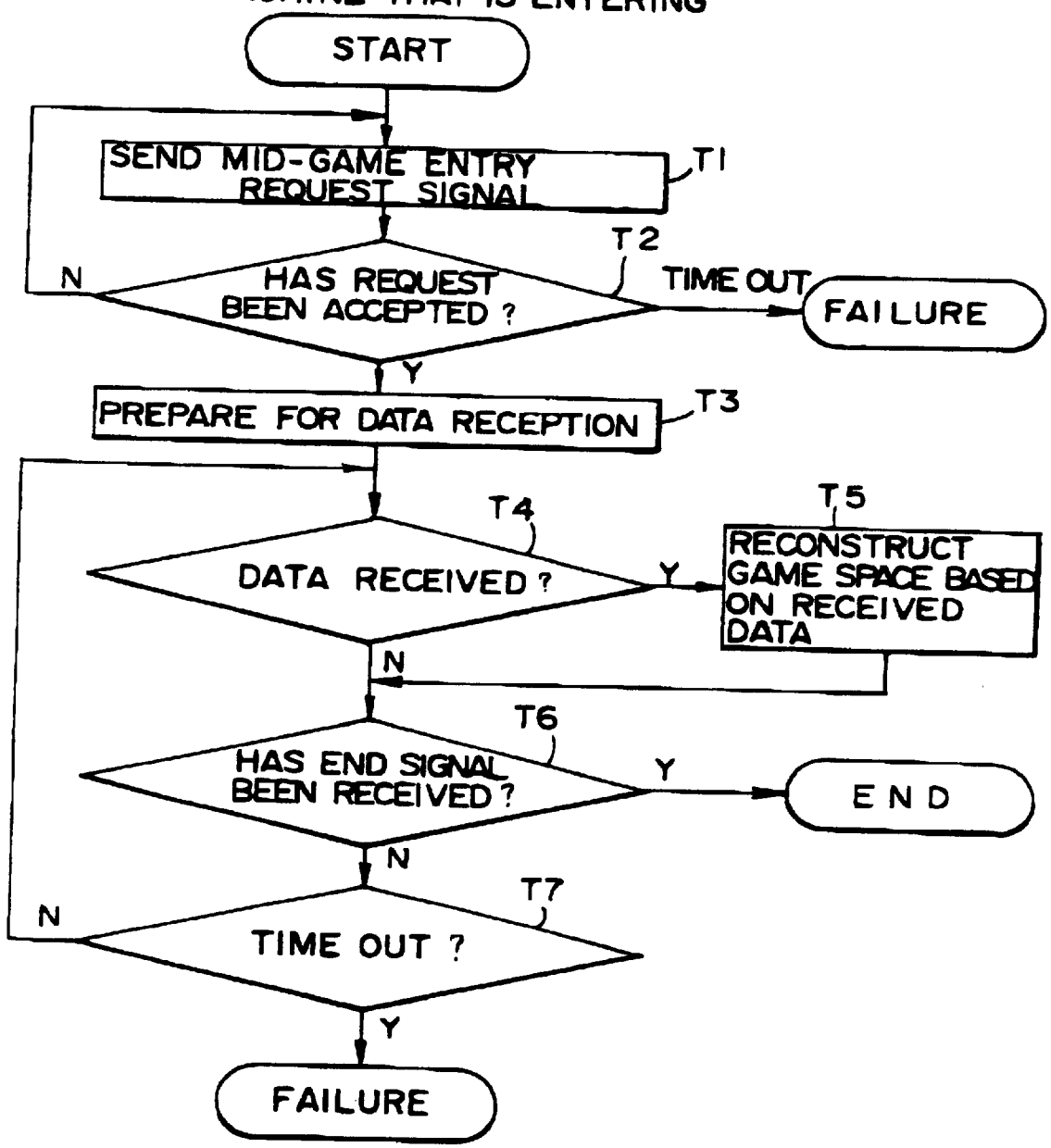

FIG. 12

RECONSTRUCTION INFORMATION

| OBJECT INFORMATION | |
|---|---|
| | OBJECT ID<br>TYPE<br>ATTRIBUTE<br>PARENT OBJECT ID<br>Etc. |
| PLAYER INFORMATION | |
| | PLAYER ID<br>STATUS INFORMATION<br>CURRENT GAME PROGRESS POINT<br>CAMERA FRAME INFORMATION<br>Etc. |
| BACKGROUND INFORMATION | |
| EVENT INFORMATION | |
| | DOOR 1 OPENING STATE<br>DOOR 2 OPENING STATE<br>- - - - - - - - -<br>HATCH 1 OPENING STATE<br>- - - - - - - - -<br>BARREL 1 STATE<br>BARREL 2 STATE<br>- - - - - - - - |
| PARTS SUBSTITUTION INFORMATION | - - - - - - |
| OTHER INFORMATION | |
| | SCORE<br>TIME<br>SCREEN STATE<br>SOUND |

FIG. 13

OBJECT INFORMATION

| OBJECT ID | TYPE | ATTRIBUTE | PARENT OBJECT ID | OTHER |
|---|---|---|---|---|
| 1 | ENEMY A | LOOKING LEFT | NONE | ---- |
| 2 | ENEMY B | LOOKING FORWARD | NONE | ---- |
| 3 | ENEMY C | LOOKING RIGHT | NONE | ---- |
| 4 | BOTTLE A | UNBROKEN | NONE | ---- |
| 5 | BOTTLE B | UNBROKEN | NONE | ---- |
| 6 | BOTTLE C | UNBROKEN | NONE | ---- |

FIG. 14

| GAME PRO-GRESS POINT | CAMERA FRAME INFORMATION | | | |
|---|---|---|---|---|
| | FRAME 1 | FRAME 2 | FRAME 3 | - - - - - |
| 1 | VP11<br>VD11 | VP12<br>VD12 | VP13<br>VD13 | - - - - - |
| 2 | VP21<br>VD21 | VP22<br>VD22 | VP23<br>VD23 | - - - - - |
| 3 | VP31<br>VD31 | VP32<br>VD32 | VP33<br>VD33 | - - - - - |
| 4 | VP41<br>VD41 | VP42<br>VD42 | VP43<br>VD43 | - - - - - |

GAME SYSTEM AND INFORMATION STORAGE MEDIUM

BACKGROUND OF THE INVENTION

1. Field of the Invention

The present invention relates to a multi-player type of game system and an information storage medium.

2. Description of Related Art

Multi-player game systems have been developed and marketed in the art, to include a plurality of game machines and enable a plurality of players to enjoy a game.

When players select multi-player mode with such a game system, they can enjoy either cooperative play or competitive play.

However, if, for example, one player has selected multi-player mode in such a game system and waits for another player to ask for entry to the game within a given time period, the other player generally cannot enter the game after that time period has elapsed.

Even if the other player is permitted to join the game while the game is in progress, it is necessary to restart the game from the initial game stage. There is thus a problem that the player who is being interrupted in the game will lose all enthusiasm and adsorption in the game.

SUMMARY OF THE INVENTION

The present invention was devised in the light of the above technical concerns and has as an objective thereof the provision of a game system and an information storage medium that enable another player to enter a game space that a first player is playing in, at any time during the game.

To solve the above described technical concerns, the present invention relates to a multi-player type of game system having a plurality of game machines that correspond to a plurality of players, the players comprising first and second players and being able to play a game together, wherein the game system comprises:

- means for accepting a mid-game entry request, the mid-game entry request being requested while one of the first and second players is playing a game in a first game space, and the mid-game entry request asking permission for another player to play the game together within the first game space;
- means for creating reconstruction information for reconstructing the first game space;
- means for transferring the reconstruction information from one game machine to another game machine; and
- means for reconstructing the first game space in another game machine, based on the reconstruction information, and for allowing the other player to play the game in the reconstructed game space.

With this aspect of the invention, when a second player at a second game machine requests mid-game entry, the first game machine accepts that request. The first game machine then creates reconstruction information for reconstructing the first game space in which the first player is playing the game. This reconstruction information is transferred to the second game machine. When that happens, the second game machine reconstructs the first game space based on the thus-received reconstruction information, enabling the second player to join in and play the game in the first game space. This means that the second player can enter the game in the first game space, at any time during the game. This makes it possible to increase the interest of competitive play and cooperative play. The first player who experiences the mid-game entry of the second player is not inconvenienced thereby, so that the entry of the second player into the game can be implemented smoothly.

In another aspect of the present invention, the reconstruction information comprises information for specifying a state of an object displayed on a display screen at one game machine. This makes it possible for images shown on the display screen of the first game machine to match the images shown on the display screen of the second game machine.

In a further aspect of the present invention, the reconstruction information comprises information for specifying the degree of game progress at one game machine. This makes it possible to ensure that the degree of game progress is the same at both of the first and second game machines.

In a still further aspect of the present invention, the reconstruction information comprises information for specifying the degree of progress of an event at one game machine, the progress of the event being controlled by each game machine. This makes it possible to ensure that the degree of progress of events is the same in both of the first and second game machines. It also enables a reduction in the volume of data to be transferred between the first and second game machines.

In a yet further aspect of the present invention, the reconstruction information comprises information for specifying a substitute part, when an object is configured of a plurality of parts. This makes it possible to prevent mutual inconsistencies between substitute parts of objects displayed by the first and second game machines.

BRIEF DESCRIPTION OF THE DRAWINGS

FIG. 10 is a flowchart illustrating a detailed processing example of the present embodiment;

FIG. 11 is another flowchart illustrating a detailed processing example of the present embodiment;

FIG. 12 is illustrative of reconstruction information;

FIG. 13 is illustrative of object information;

FIG. 14 is illustrative of camera frame information;

DESCRIPTION OF PREFERRED EMBODIMENT

A preferred embodiment of the present invention will now be described with reference to the accompanying drawings.

Figure 1:
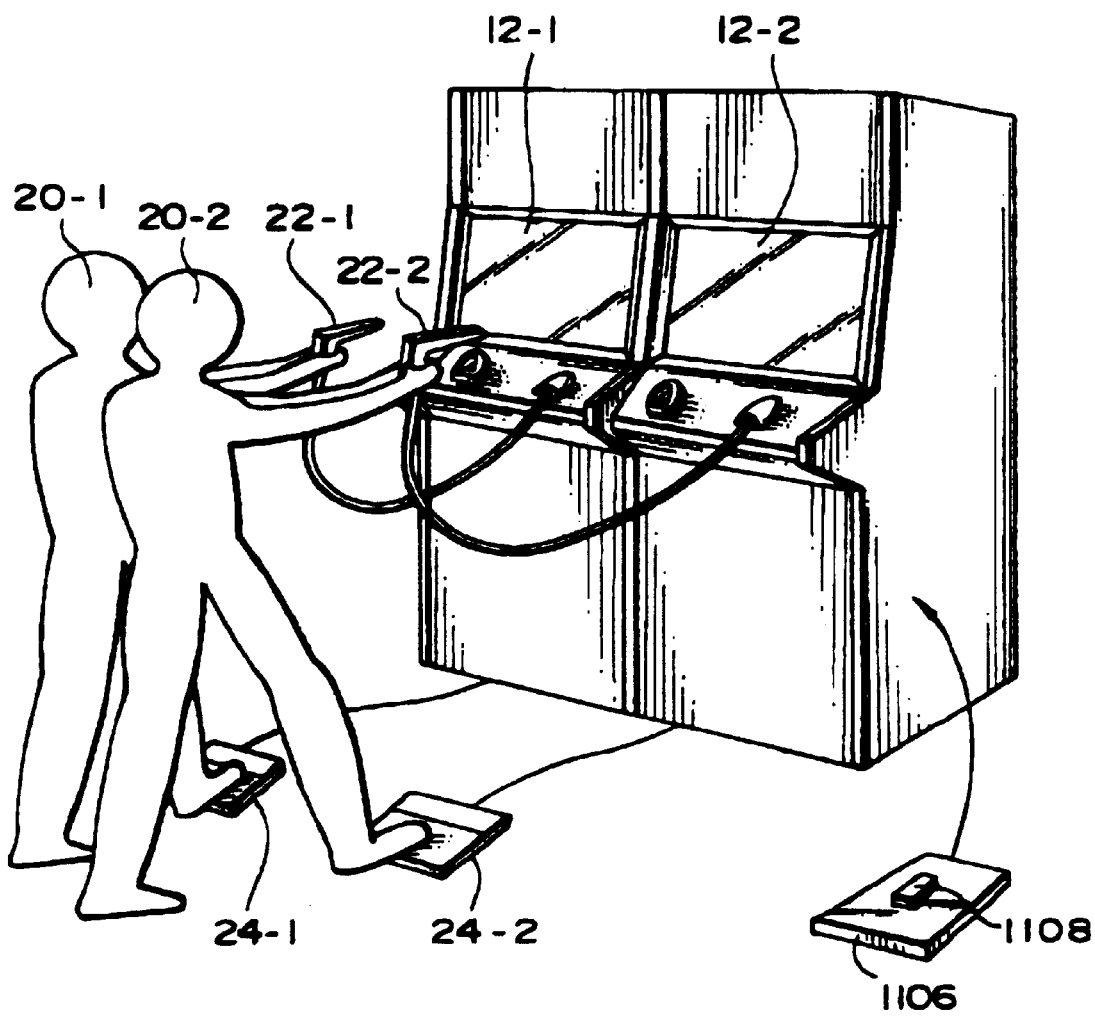
FIG. 1 an example of the external appearance of a game system of one embodiment of the present invention.

Note that, although the description below concerns a case in which a game system comprises two game machines, the present invention is not limited thereto and could equally well be applied to a game system that comprises three or more game machines. Similarly, the description below relates to the application of the present invention to a gun-wielding game wherein players can use handgun-shaped controllers to enact gun battles, but the present invention can also be applied to various other games An example of the external appearance of an arcade game system to which the present embodiment is applied is shown in FIG. 1.

The present embodiment of the invention is provided with a first display screen 12-1 for a first player (hereinafter called the "1P player") 20-1 and a second display screen 12-2 for a second player (hereinafter called the "2P player") 20-2. Images as seen from a first viewpoint in an object space are displayed on the first display screen 12-1 and images as seen from a second viewpoint in the object space are displayed on the second display screen 12-2. The 1P player 20-1 enjoys a gun-wielding game by using a handgun-shaped controller (shooting device) 22-1 to shoot at a target object that appears on the first display screen 12-1. On the other hand, the 2P player 20-2 enjoys the gun-wielding game by using a handgun-shaped controller 22-2 to shoot at a target object that appears on the second display screen 12-2.

Note that, in the present embodiment, character objects (virtual players) corresponding to the players on the display screens 12-1 and 12-2 can be made to duck down and stand up (lower and raise the viewpoints thereof), by stepping on pedals 24-1 and 24-2. This makes it possible to perform actions such as using an obstacle to avoid an attack from a target (enemy) object.

In the present embodiment, the 1P player 20-1 and the 2P player 20-2 can enjoy the gun-wielding game while viewing images from mutually different viewpoints. This enables a great improvement in the degree of virtual realism and the dramatic effect of the game over previous gun-wielding games.

Figure 2:
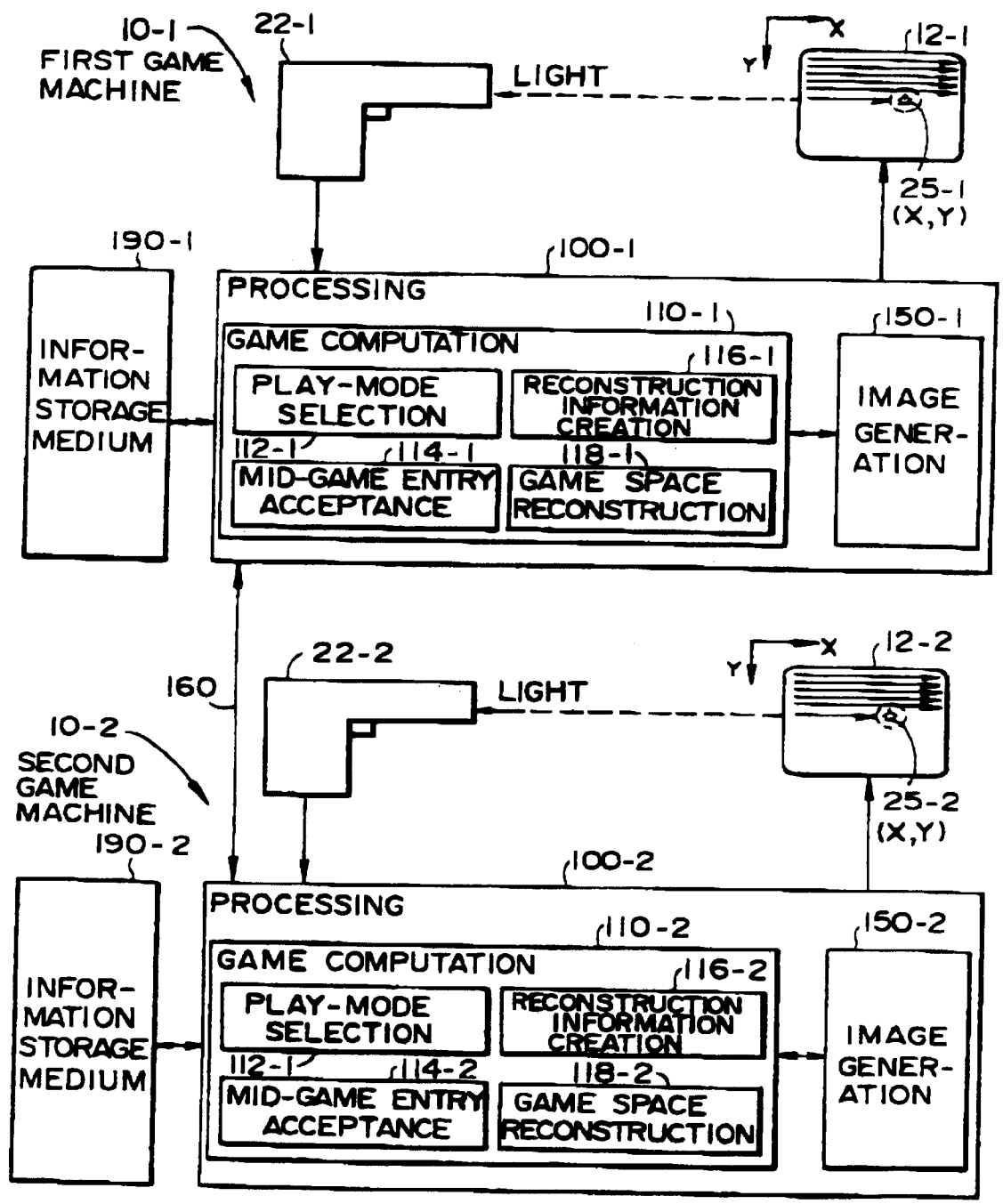
FIG. 2 shows an example of the functional block diagram of the game system of the present embodiment.

An example of a functional block diagram of the game system of the present embodiment is shown in FIG. 2.

The game system of the present embodiment comprises first and second game machines 10-1 and 10-2, as shown in FIG. 2. These first and second game machines 10-1 and 10-2 are connected together by a communications line (network) 160, so that necessary data can be exchanged therebetween.

Lenses and photosensors (not shown in the figure) built into the handgun-shaped controllers 22-1 and 22-2 are used to optically detect the X and Y coordinates of positions (landing positions of shots) indicated 25-1 and 25-2 by the handgun-shaped controllers 22-1 and 22-2. In the present embodiment, a hit check between each target object and shot is based on the thus-detected indicated positions 25-1 and 25-2 and the viewpoint positions and line-of-sight directions of the 1P and 2P players.

Two processing sections 100-1 and 100-2 perform processing such as that for disposing objects within the object space, performing a hit check, and generating an image as seen from a given viewpoint of the object space, based on information such as input data from the handgun-shaped controllers 22-1 and 22-2 and a given program. The functions of these processing sections 100-1 and 100-2 could be implemented by hardware such as a CPU (either CISC or RISC), a DSP, a custom IC (such as a gate array), or memory.

Information storage media 190-1 and 190-2 stores programs and data. The functions of these information storage media 190-1 and 190-2 could be implemented by hardware such as a CD-ROM, game cassette, IC card, magneto-optical disk, floppy disk, digital video disk, hard disk, or memory. The processing sections 100-1 and 100-2 perform the various kinds of processing thereof based on programs and data from these information storage media 190-1 and 190-2.

The processing sections 100-1 and 100-2 comprise corresponding game computation sections 110-1 and 110-2 and image generation sections 150-1 and 150-2.

In this case, the game computation sections 110-1 and 110-2 perform the various processing such as setting the play mode, moving the game forward, setting the objects within the object space, performing a hit check, and determining the viewpoint position and line-of-sight direction.

Each of the image generation sections 150-1 and 150-2 generates and outputs an image at a given viewpoint within the object space as set by the corresponding game computation sections 110-1 and 110-2. The images generated by the image generation sections 150-1 and 150-2 are displayed on the corresponding first and second display screens 12-1 and 12-2.

The game computation sections 110-1 and 110-2 comprise corresponding play-mode selection sections 112-1 and 112-2, mid-game entry acceptance sections 114-1 and 114-2, reconstruction information creation sections 116-1 and 116-2, and game space reconstruction sections 118-1 and 118-2.

Each of the play-mode selection sections 112-1 and 112-2 performs the processing for a player to select a play mode. In other words, the present embodiment makes it possible for players to select either single-player mode in which one person plays the game or multi-player mode in which two people play the game. This play-mode selection is done at a suitable time, such as when a player inserts a coin.

When the 2P player requests a mid-game entry for playing the game in the first game space while the 1P player is already playing the game in the first game space, for example, the mid-game entry acceptance sections 114-1 and 114-2 performs the processing to accept the mid-game entry request. The present embodiment makes it possible for another player to play the game together in this first game space, at any time while the first player is playing the game. This makes it possible to increase the chances for another player to enter a cooperative or competitive game, in comparison with prior-art examples in which there is a limited time period during which a player can enter mid-game. In addition, the degree of adsorption of the players in the game can be increased in comparison with prior-art examples in which it is necessary to restart playing the game scenario from the beginning when a player has entered in mid-game.

The reconstruction information creation sections 116-1 and 116-2 perform the processing to create reconstruction information for the game space, as will be described later. The thus-created reconstruction information is sent from one game machine to another game machine over the communications line 160.

The game space reconstruction section 118-1 and 118-2 perform the processing to reconstruct the first game space based on the reconstruction information sent from the other game machine. This makes it possible for another player to play the game within the first game space at the second game machine.

The description now turns to a gun-wielding game that is implemented by the present embodiment of the invention.

Figure 3:
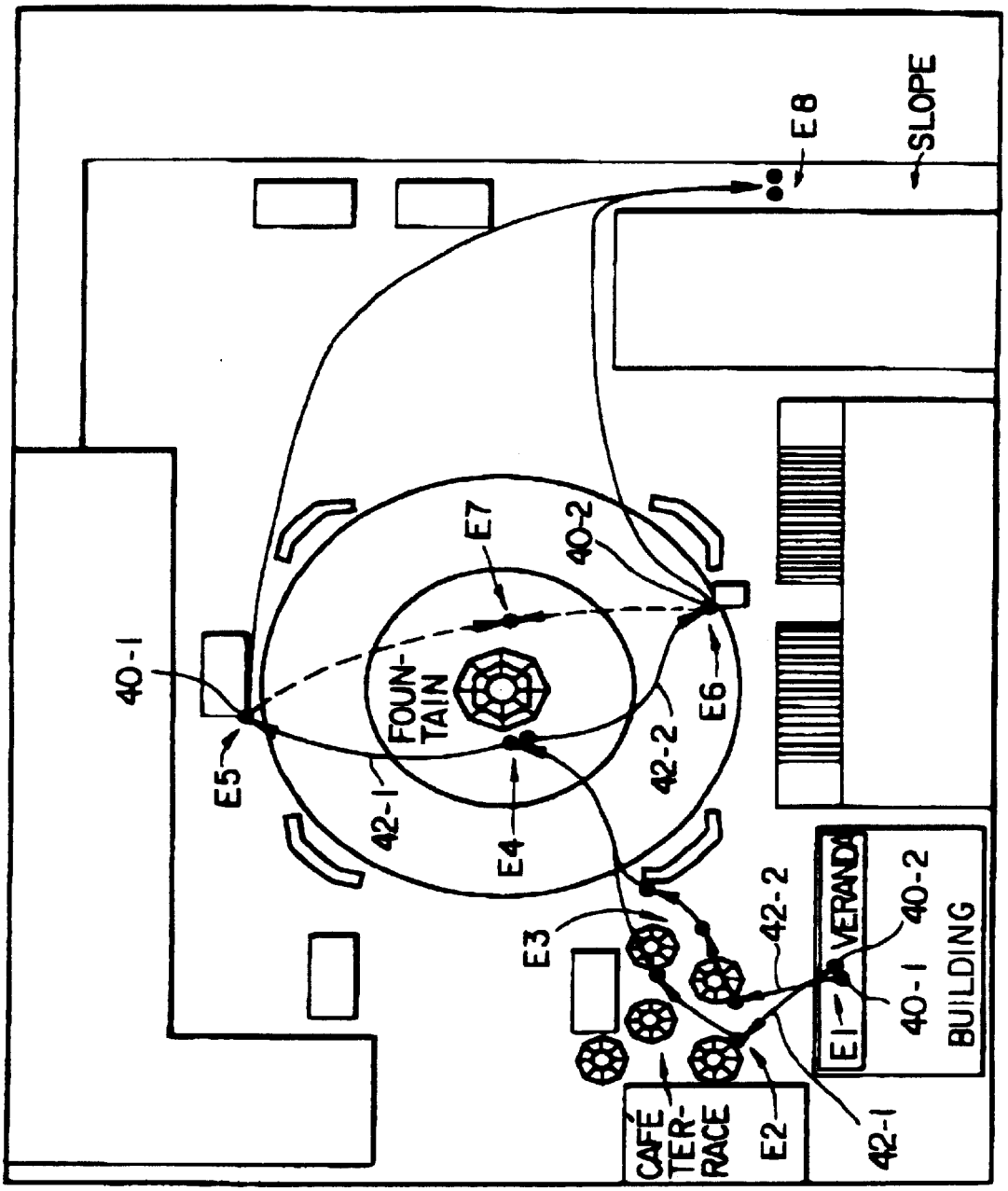
FIG. 3 shows an example of a game stage for a gun-wielding game that is implemented by the present embodiment.

A typical map of the game stage of this gun-wielding game is shown in FIG. 3. First and second viewpoints 40-1 and 40-2 (character objects) of the 1P and 2P players move along given movement paths 42-1 and 42-2, as shown in FIG. 3. Control over the movements of first and second viewpoints 40-1 and 40-2 in this case is based on a given viewpoint control program and viewpoint control data. The line-of-sight direction and field of view at each of the first and second viewpoints 40-1 and 40-2 are also controlled. This ensures that different images can be supplied to each player.

Examples of images that are generated by the present embodiment and displayed on the first and second display screens 12-1 and 12-2 are shown schematically in FIGS. 4A to 9C.

Figure 4A:
FIGS. 4A, 4B, 4C, and 4D are schematic impressions of images created by the present embodiment.
Figure 4B:
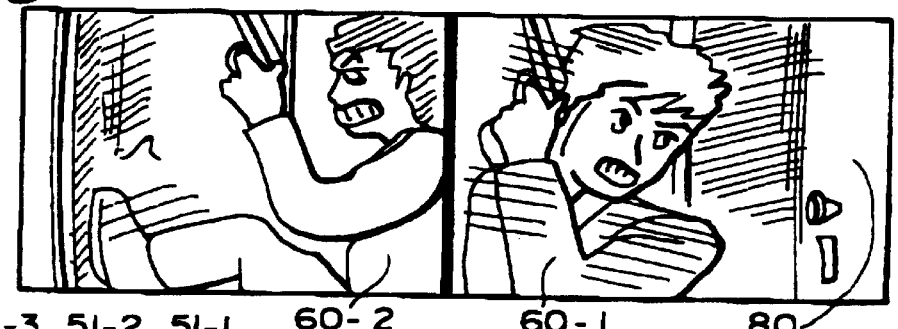

FIGS. 4A to 4D show examples of the images seen when the first and second viewpoints 40-1 and 40-2 are positioned within a building, as shown at E0 in FIG. 3 (when the 1P and 2P character objects are within the building). In FIG. 4A, a 2P character object (virtual player) 60-2 corresponding to the 2P player is shown on the first display screen and a 1P character object 60-1 corresponding to the 1P player is shown on the second display screen. When a door 30 is opened, as shown in FIG. 4B, a game sound "Action!" is heard and a gun battle starts. The 1P and 2P players 20-1 and 20-2 aim and shoot at target objects 50-1, 50-2, and 50-3 with the respective handgun-shaped controllers 22-1 and 22-2 of FIG. 1. The players can make the corresponding character objects rise or move sideways to a position at which a target object can be seen by stepping on the pedals 24-1 and 24-2. On the other hand, they can make the corresponding character objects duck down or move sideways to hide behind an obstacle by removing their feet from the pedals 24-1 and 24-2. When a shot hits one of the target (enemy) objects 50-1, 50-2, and 50-3, an action occurs to indicate that the target object has been hit. When a shot hits one of target (bottle) objects 51-1, 51-2, and 51-3, an animation indicating that the relevant target object has been destroyed is displayed.

Figure 5A:
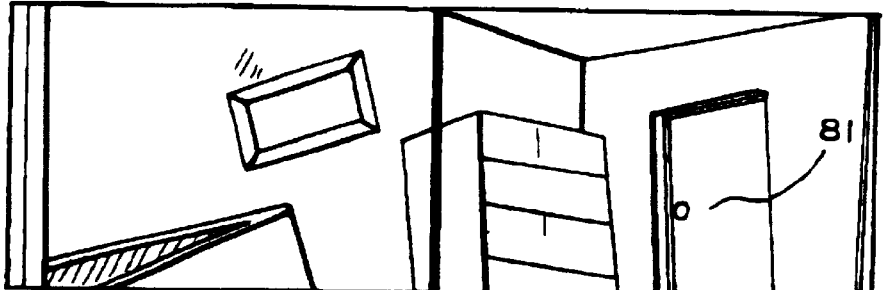
FIGS. 5A, 5B, 5C, and 5D are schematic impressions of more images created by the present embodiment.
Figure 5B:
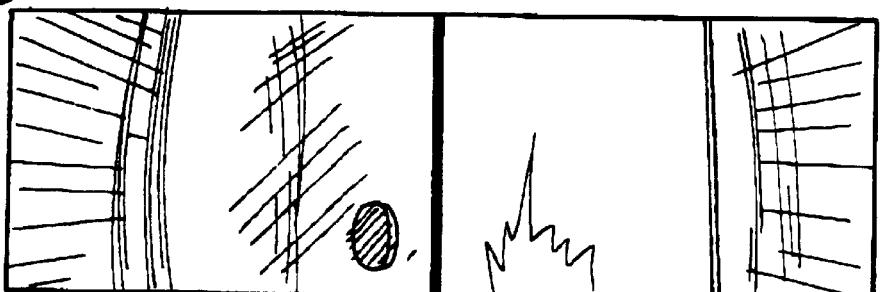
Figure 5C:
Figure 5D:
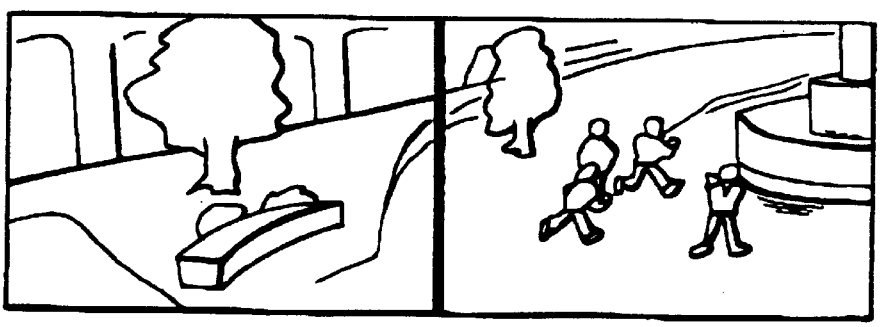

When the target objects have been completely destroyed, the scene changes as shown in FIG. 5A. When a character object then opens a door 81 as shown in FIG. 5B, the character objects move out onto the veranda of the building, as shown in FIG. 5C. A scene in which an enemy boss is escaping with the followers is shown on the display screens, as shown in FIG. 5D.

Figure 6A:
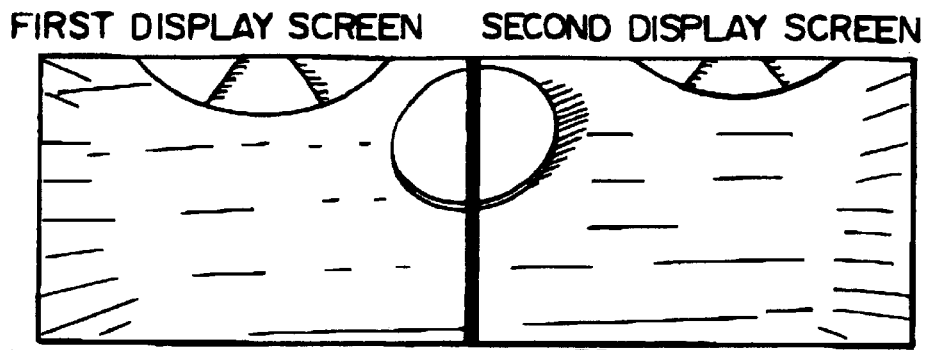
FIGS. 6A, 6B, 6C, and 6D are schematic impressions of even more images created by the present embodiment.
Figure 6B:
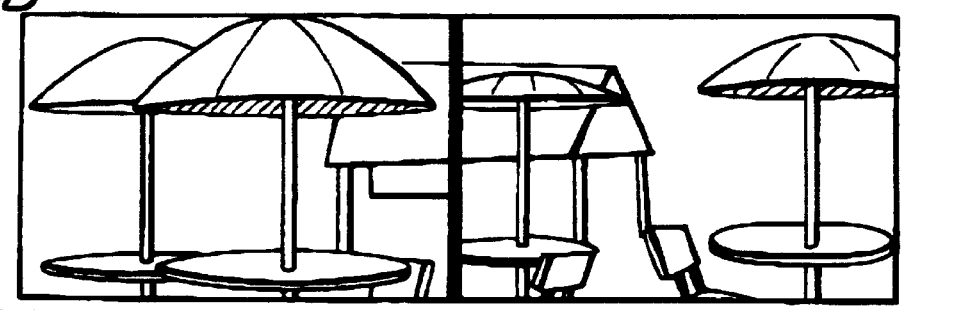

FIGS. 6A and 6B show examples of the images seen when the first and second viewpoints 40-1 and 40-2 are positioned at E1 and E2, respectively, of FIG. 3. The character objects of the 1P and 2P players, who are chasing the enemy boss, jump down from the veranda of the building and move onto a cafe terrace. Note that the fields of view of the 1P and 2P players do not overlap in the first and second display screens shown in FIGS. 6A and 6B, but these fields of view could overlap if required.

Figure 6C:
Figure 6D:
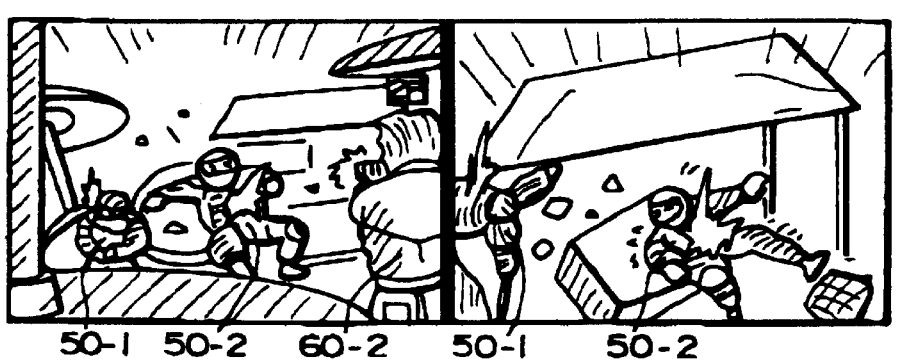

When a combat point on the cafe terrace is reached, target (enemy) objects 50-1 and 50-2 appear, as shown in FIG. 6C. At that point, the game sound "Action!" is heard and another gun battle starts. The 1P and 2P players 20-1 and 20-2 aim and shoot at the target objects 50-1 and 50-2 with the respective handgun-shaped controllers 22-1 and 22-2 of FIG. 1 When a shot hits one of the target objects 50-1 and 50-2, an action occurs to indicate that the target object has been hit, as shown in FIG. 6D.

Figure 7A:
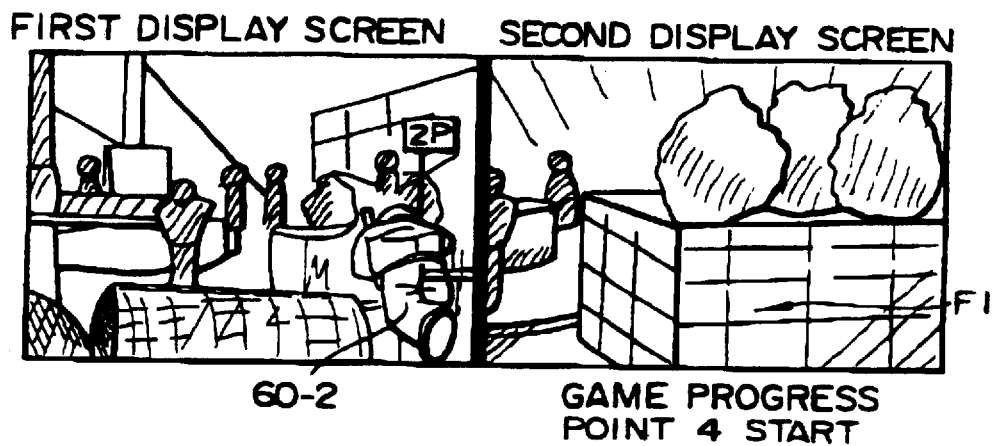
FIGS. 7A, 7B, and 7C are schematic impressions of still more images created by the present embodiment.
Figure 7B:
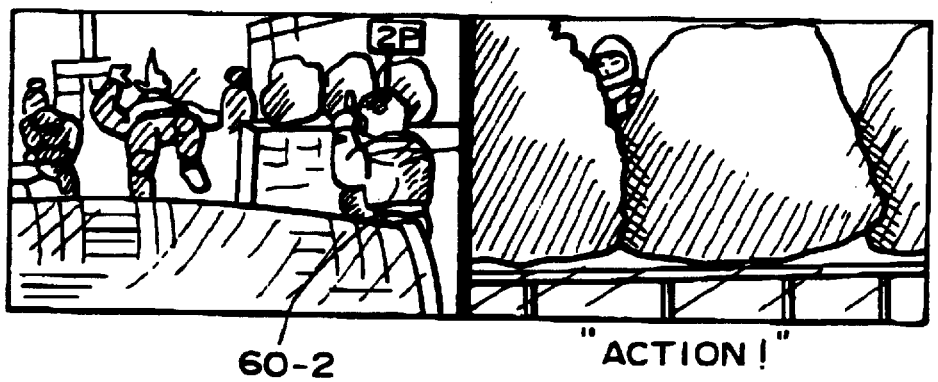
Figure 7C:
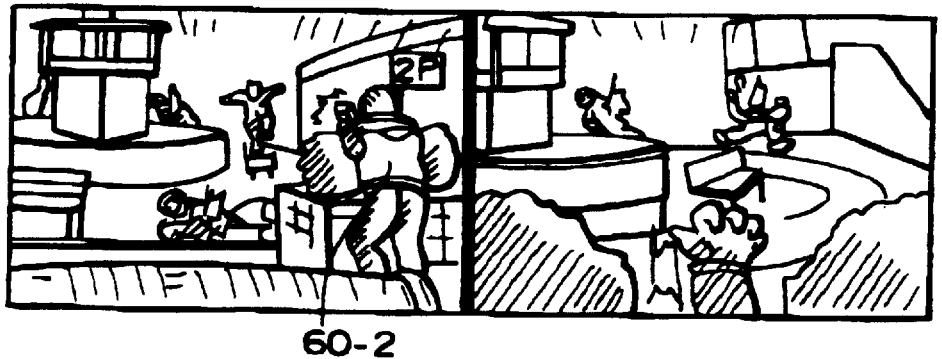

The combat point then moves from the position indicated by E2 in FIG. 3 to the position indicated by E3. At this point, the 2P character object 60-2 (the second viewpoint 40-2) moves first, then waits at the position indicated by F1, as shown in FIG. 7A. Subsequently, the game sound "Action!" is heard and a gun battle with the target objects starts, as shown in FIG. 7B. When a shot hits a target object, as shown in FIG. 7C, an action is performed to indicate that the target object has been hit.

Figure 8A:
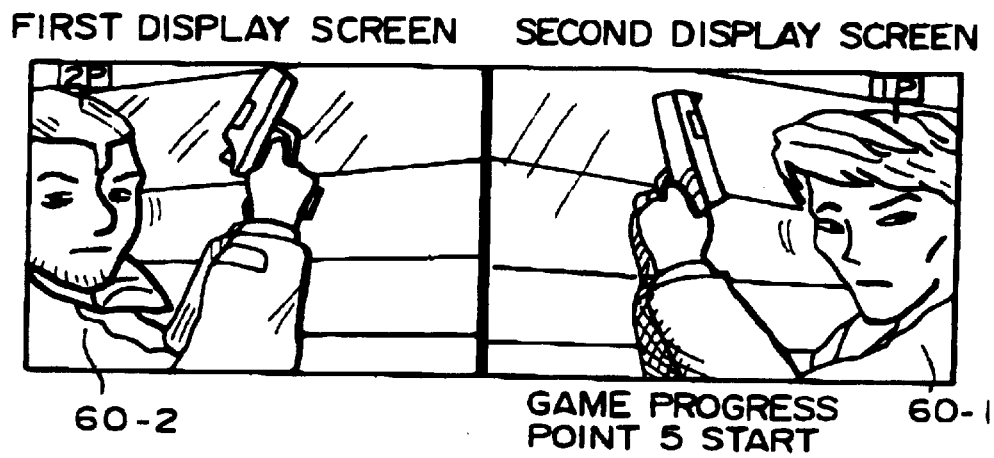
FIGS. 8A, 8B, and 8C are schematic impressions of yet more images created by the present embodiment.
Figure 8B:
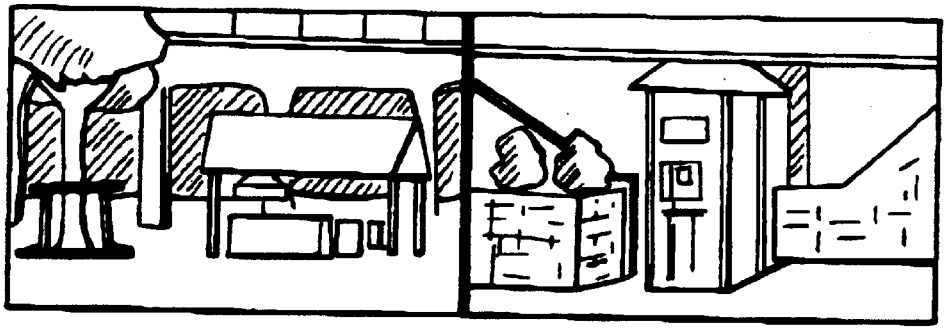
Figure 8C:
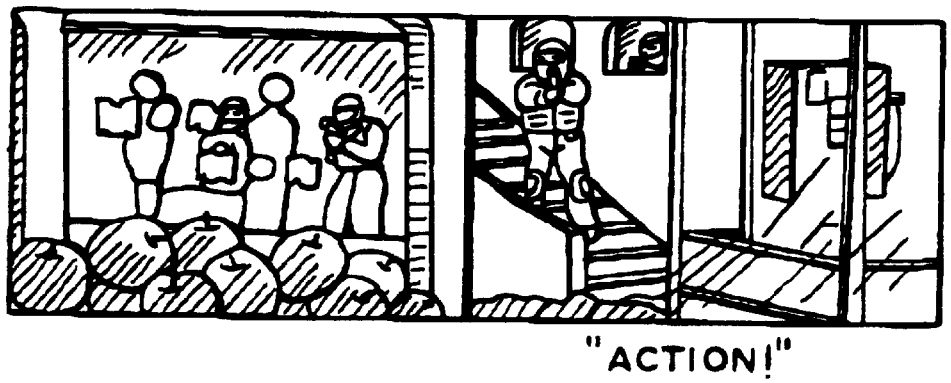

The first and second viewpoints 40-1 and 40-2 next move from the position indicated by E3 in FIG. 3 to the position indicated by E4. The 1P and 2P character objects nod at each other, as shown in FIG. 8A. The first viewpoint 40-1 then moves to the position indicated by E5 in FIG. 3 and the second viewpoint 40-2 moves to the position indicated by E6. After that, the first and second display screens display images such as those shown in FIG. 8B. The game sound "Action!" is again heard and a gun battle starts as shown in FIG. 8C. In this case, if one of the 1P and 2P players has not destroyed all the target objects in the corresponding field of view but the other of the players has destroyed all the target objects in the other field of view, the other viewpoint moves to an support point indicated by E7 in FIG. 3. Cooperative play starts, in which the 1P and 2P players can cooperate in shooting the target objects that are now within the common field of view.

Figure 9A:
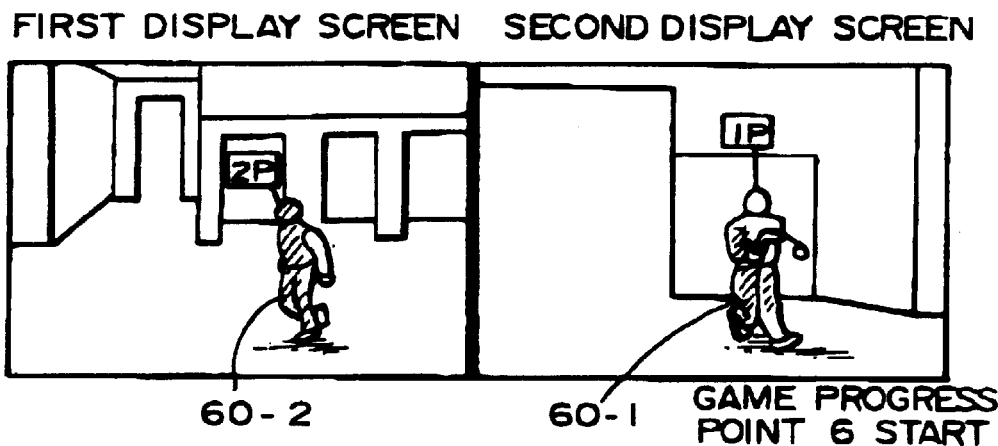
FIGS. 9A, 9B, and 9C are schematic impressions of further images created by the present embodiment.
Figure 9B:
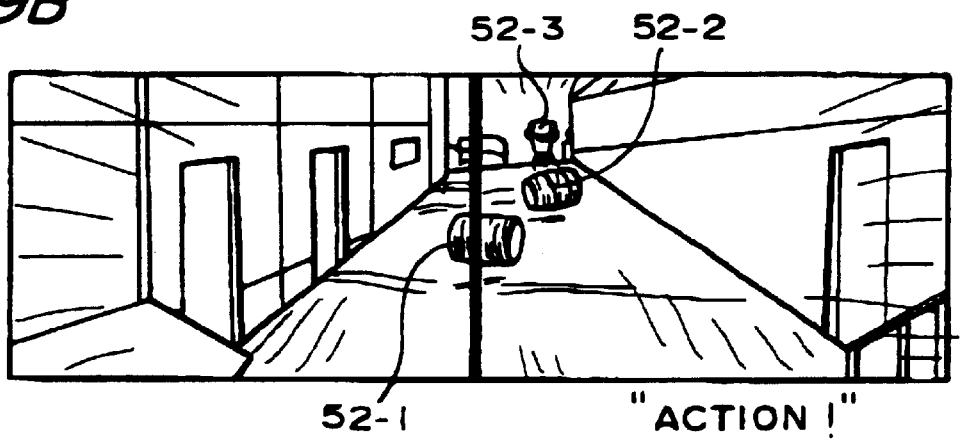
Figure 9C:

The first and second viewpoints 40-1 and 40-2 next move from the positions indicated by E5, E6, or E7 in FIG. 3 to the position indicated by E8. Examples of images displayed on the first and second display screens during this time are shown in FIG. 9A. When the position at E8 is reached, an enemy starts throwing target objects (barrels) 52-1, 52-2, and 52-3, as shown in FIG. 9B. When this happens, the 1P and 2P players start shooting at these target objects (barrels), as shown in FIG. 9C.

Note that, when the 1P and 2P players 20-1 and 20-2 step on the corresponding pedals 24-1 and 24-2 of FIG. 1 in this case, the present embodiment allows the corresponding first and second viewpoints (character objects) to move forward.

The game proceeds as described above. The game system in accordance with the present embodiment of the invention makes it possible for another player to enter the game at any point during the game that is proceeding as described above. In other words, consider a case in which the 1P player has been playing the game in single-player mode up to immediately before FIG. 6C. In such a case, when the 2P player inserts a coin and selects multi-player mode at the point shown at FIG. 6C, a mid-game entry of the 2P player is permitted and the 1P and 2P players are able to play cooperatively from the point shown in FIG. 6C onward. Similarly, mid-game entries are permitted at any other point, such as those shown in FIG. 6D, 7A, or 7B. Note that the configuration is such that the mid-game entry of the 2P player is permitted when the 1P player had selected multi-player mode at the start of the game. Note also that the 2P player can select single-player mode, even if the 1P player had selected multi-player mode.

To ensure that another player can join into a game at any time during the game, as described above, the present embodiment has the characteristics described below. If, for example, the 2P player requests mid-game entry while the 1P player is playing the game in the first game space (if multi-player mode was selected when the coin was inserted) the mid-game entry acceptance section 114-1 of the first game machine 10-1 of FIG. 2 accepts this request. The corresponding reconstruction information creation section 116-1 creates reconstruction information for reconstructing the first game space. The thus-created reconstruction information is then set from the first game machine 10-1 to the second game machine 10-2 over the communications line 160. When this happens, the game space reconstruction section 118-2 of the second game machine 10-2 reconstructs the first game space based on the thus-transferred reconstruction information, so that the 2P player can play the game in the reconstructed game space. This makes it possible for another player to enter the game at any time.

This processing is shown more specifically by the flowcharts of FIGS. 10 and 11. Note that the description below concerns a case in which the first game machine (1P player) accepts the second game machine's entry during a game and the second game machine (2P player) enters the game.

FIG. 10 is a flowchart of the operation of the first game machine, which is joined during the game.

The first game machine determines whether or not a mid-game entry request signal has been received from the second game machine (step S1). If it has been received, the first game machine sends a request acceptance signal to the second game machine (step S2).

The first game machine then records the current game progress point and camera frame information (at the time at which the request for mid-game entry is accepted) and also creates a list of existing objects (objects that are present at request acceptance) (step S3).

In the present embodiment of the invention, game progress points 1, 2, 3, 4, 5, and 6 start from the scenes shown in FIGS. 4A, 5A, 6A, 7A, 8A, and 9A, respectively. Therefore, when a mid-game entry request is accepted within the time period shown by FIGS. 4A to FIG. 4D, game progress point 1 is recorded. Similarly, when a mid-game entry request is accepted within the time period shown by FIGS. 5A to 5D, 6A to 6D, 7A to 7C, 8A to 8C, or 9A to 9C the corresponding game progress point 2, 3, 4, 5, or 6 is recorded.

Figure 4C:
Figure 4D:

When the request is accepted during the frame showing the image of FIG. 4C, for example, the list of objects which are shown in the frame, such as the target (enemy) objects 50-1, 50-2, and 50-3, the target (bottle) objects 51-1, 51-2, and 51-3, and the door object, is created.

The reconstruction information shown in FIG. 12 is then created based on this list (step S4). This reconstruction information comprises details such as object information, player information, background information, event information, and parts substitution information, as shown in FIG. 12.

In this case, object information is information specifying the state of objects displayed on the display screen at one game machine, and comprises object ID, type, attribute, parent object ID, and the like. An example of this object information is shown in FIG. 13. The object ID is the serial number of each object listed in step S3 of FIG. 10. The type is used for specifying the type of the listed object. For example, the type of each of the target objects 50-1, 50-2, and 50-3 in FIG. 4C is enemy A (such as an enemy wearing red), enemy B (such as the boss), and enemy C (such as an enemy wearing yellow), respectively. The type of each of the target objects 51-1, 51-2, and 51-3 is bottle A, bottle B, and bottle C, respectively (all of these bottles could be of the same type). More specifically, data for generating an image of an object is stored by the present embodiment in a given storage area within the game machine, where this data is made up of the positions of vertices of a plurality of polygons that form this object and textures to be mapped onto the polygons. The type of the object specifies which data is to be read out of this storage area. The attribute data is used to specify the attribute of each listed object. For example, the attributes of each of the target objects 50-1, 50-2, and 50-3 in FIG. 4C are "looking left," looking ahead," and "looking right," respectively. The target (bottle) objects 51-1, 51-2, and 51-3 all have an "unbroken" attribute. Note that when the mid-game entry request is accepted during the frame shown in FIG. 4D, the attribute of all the target (bottle) objects 51-1, 51-2, and 51-3 would be "broken." The parent object ID specifies the ID of the parent object of each listed object. For example, when an enemy is riding on a truck, the position coordinates of the enemy are specified by the position coordinates of the truck. Therefore, the parent object ID in that case is the ID of the truck object.

The player information comprises the player ID, status information, the current game progress point, camera frame information, and the like. The player ID is the serial number of each player. The status information is information for specifying the state of the player (character object). This status information comprises information such as whether or not the pedal 24-1 of FIG. 1, belonging to the 1P player whose game is being entered into, is pressed and whether or not the 1P character object is in a critical state of being attacked by enemies. The current game progress point and camera frame information are as recorded in step S3 of FIG. 10. An example of viewpoint control data for providing viewpoint control is shown in FIG. 14. In this figure, a viewpoint position VP and line-of-sight direction VD are specified by using the game progress point and camera frame information that specifies the number of frames at the time period of each game progress point. For example, when the scene of FIG. 4C is the fiftieth frame from the frame shown in FIG. 4A, the viewpoint position and line-of-sight direction in FIG. 4C can be read out by specifying 1 as the game progress point and 50 as the camera frame information.

It is possible to specify how far the game has progressed, by using this game progress point and camera frame information. In other words, the game progress point and camera frame information function as information for specifying how far the game has progressed in the game machine that is being entered upon during the game.

The background information is information for specifying the background at the point at which the mid-game entry request is accepted. For example, in a scene in which a character object is riding on a train, the background will differ depending on whether the train is travelling on a right-hand curve, on a straight track, or on a left-hand curve. In such a case, it is possible to specify whether the background is that for a right-hand curve, a straight track, or a left-hand curve, by using this background information.

The event information is information for specifying the degree of progress of events at the game machine that is being entered upon. An event in this case indicates an event whose progress is controlled by each game machine.

For example, consider an event that represents the opening of the door 80 in FIG. 4B (hereinafter called a "door-opening event"). When the door-opening event occurs in multi-player mode, information that simply state that such event has occurred is sent from one game machine to the other game machine, and each game machine controls the subsequent door movement. Use of such a method makes it possible to send only the information that a certain event has occurred, greatly reducing the amount of data that is transferred between the game machine.

Figure 15:
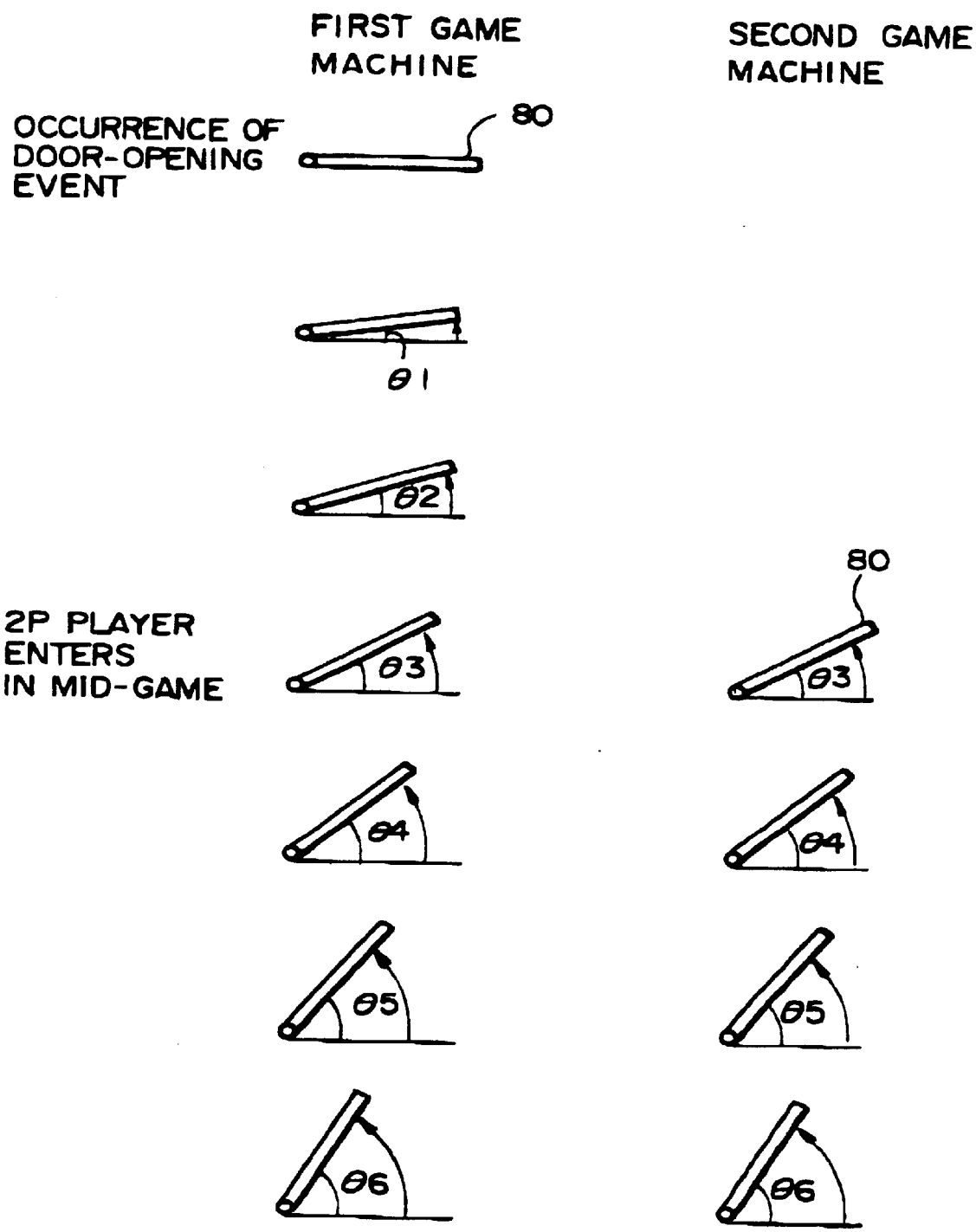
FIG. 15 is illustrative of event information.

However, use of this method causes some problems. For example, consider a case in which the 2P player enters the game at a point at which the door-opening event has occurred and the door 80 has opened through an angle θ3, as shown in FIG. 15. In this case, the door-opening event is a past phenomenon (by gone event) at the point at which the mid-game entry occurs, as far as the second game machine is concerned. Therefore, the second game machine cannot control the opening of the door 80.

With the present embodiment of the invention, the opening angle θ3 of the door 80 (the door-opening state) at the point at which the 2P player enters the game (when the mid-game entry request is accepted) is included as event information within the reconstruction information for the game space. This ensures that the second game machine can start to control the event of opening the door, using θ3 as an initial value. It is therefore possible to prevent the occurrence of any discrepancy or inconsistency between the details on the first and second display screens.

Another example of event for each game machine to control the progress is the barrel-throwing events shown in FIGS. 9B and 9C. These events are also controlled in multi-player mode by simply sending information that a barrel-throwing event has occurred, and the subsequent motion of each barrel is controlled by each game machine. Therefore, in the present embodiment, the position and direction of each barrel (barrel state) at mid-game entry is included within the reconstruction information as event information.

In a game system in which the game story (scenario) branches in accordance with factors such as the game results of the players, a situation could occur in which either a certain door is open and another door is not open, depending on the game results of each player. Therefore, in the present embodiment, the opening state of a door that was open or closed before the point at which another player enters the game is included in the event information.

Note that the present embodiment is configured in such a manner that the movements of target (enemy) objects are controlled by a master game machine only. In other words, the master game machine specifies the position and direction of each part of a target (enemy) object based on given motion data, and information on this position and direction is transferred to the slave game machine for each frame. The event information of FIG. 12 is therefore unnecessary for the event to move target (enemy) objects.

Figure 16A:
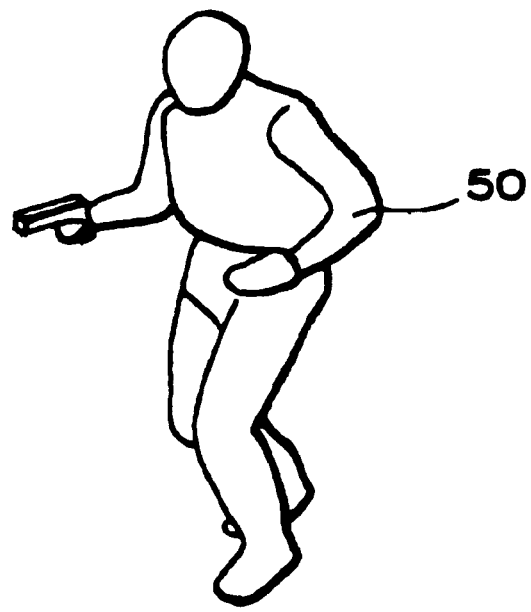
FIGS. 16A and 16B are illustrative of parts substitution information.
Figure 16B:
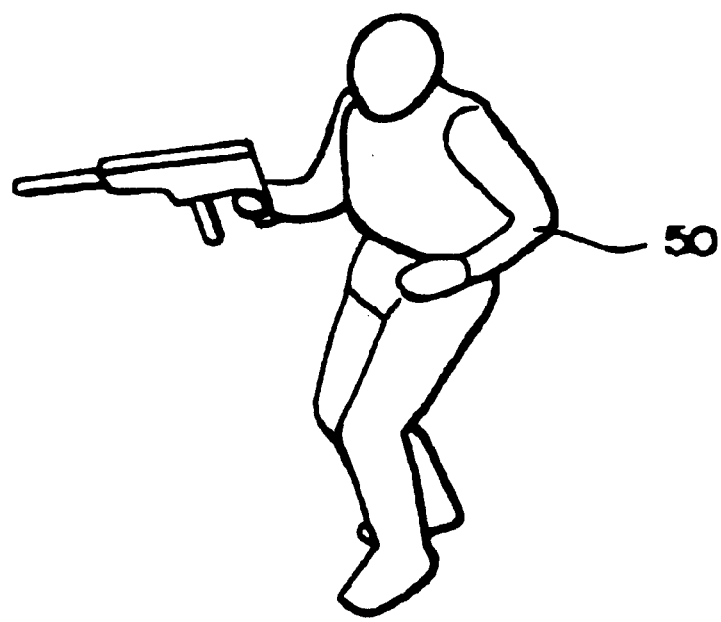

The parts substitution information is information for specifying the substitution of a part that configures an object. For example, the hand part of a target (enemy) object can be changed from a hand part holding a pistol to a hand part holding a machine gun, as shown in FIGS. 16A and 16B. This parts substitution may be a past event at the point at which another player enters the game. In a game system in which the game story branches in accordance with factors such as the game results of the players, parts could be substituted or not substituted depending on the game results of the players. It is therefore necessary to have information for specifying the substitution state of parts at the mid-game entry, in order to reconstruct a game space with no inconsistencies.

Other information within the reconstruction information relates to the game score, time, screen state, and sound that were current in the game machine that is being entered upon at the point at which another player joins the game. A game space with no inconsistencies can be reconstructed by including such information within the reconstruction information.

The description returns to FIG. 10. After the reconstruction information of FIG. 12 has been created, the first game machine that is being entered upon during the game sends object information comprising the reconstruction information to the second game machine that is entering the game (steps S5 and S6). When the transfer of object information for all of the objects is complete information that is included in the reconstruction information such as, player information, background information, event information, parts substitution information, and other information is also sent (steps S7 to S11). Finally, an end signal is sent (step S12).

FIG. 11 shows the operation of the second game machine that is entering the game.

When the 2P player selects multi-player mode, the second game machine sends a mid-game entry request signal to the first game machine (step T1). When the first game machine accepts the request (step S2 in FIG. 10), the second game machine prepares for data reception (steps T2 and T3).

When data is received, the game space is reconstructed based on this received data (reconstruction information) (steps T4 and T5). The data transfer process is repeated until the end signal (step S12 of FIG. 12) is received (steps T6 and T7).

When for example, a scene in which a door opens or closes is to be reproduced, image information for the door is obtained from the object information comprised within the reconstruction information. Details such as the angle of opening of the door are obtained from the event information comprised within the reconstruction information. The state of the door opening and closing is then reproduced on the second display screen of the second game machine, based on the thus-obtained information.

In this manner, the game space in which the 1P player is playing a game on the first game machine can be reconstructed on the second game machine, to enable the 2P player to play the game within the reconstructed game space.

Note that the processing described above with reference to FIGS. 10 and 11 is implemented by the operation of the processing sections 100-1 and 100-2, based on software such as programs and data stored in the information storage media 190-1 and 190-2 of FIG. 2 (such as is stored in memory 1108 on a system board 1106 of FIG. 1.)

Note also that the present invention has been described above with reference to a specific embodiment thereof, but it can be implemented in many other ways.

For example, the information comprised within the reconstruction information is preferably that shown in FIG. 12, but it is not limited thereto.

Figure 17A:
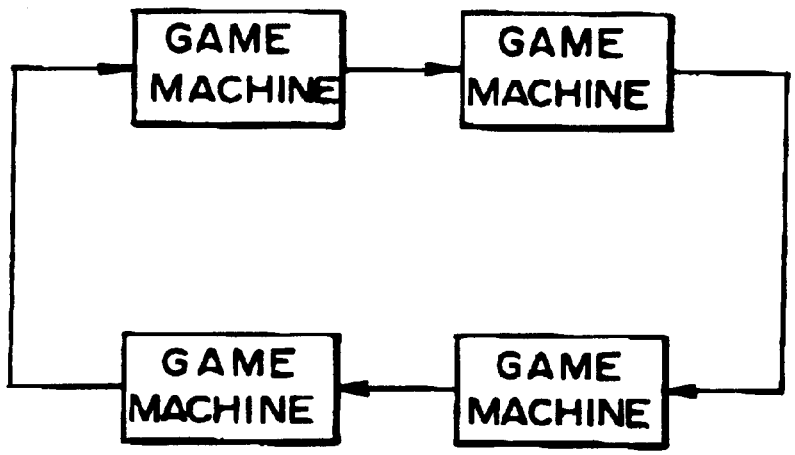
FIGS. 17A, 17B, and 17C show examples of various connection states of game machines.
Figure 17B:
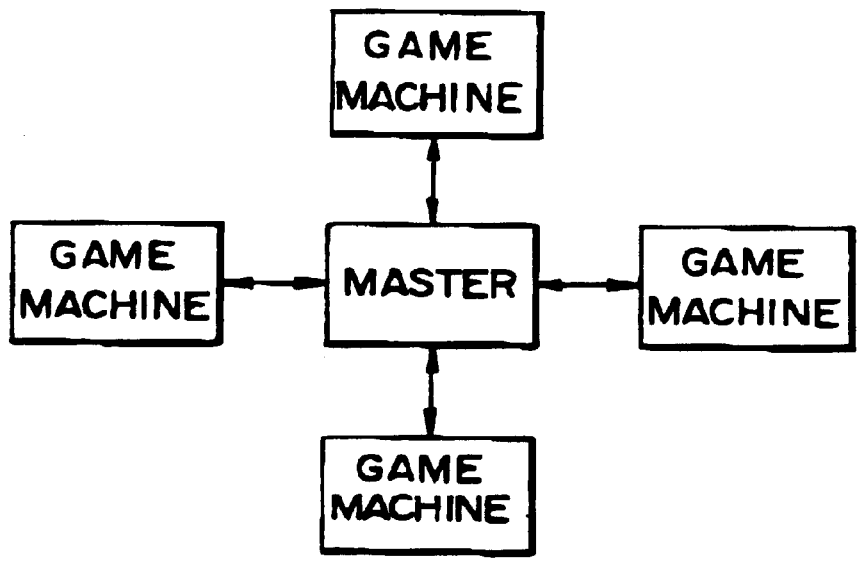
Figure 17C:
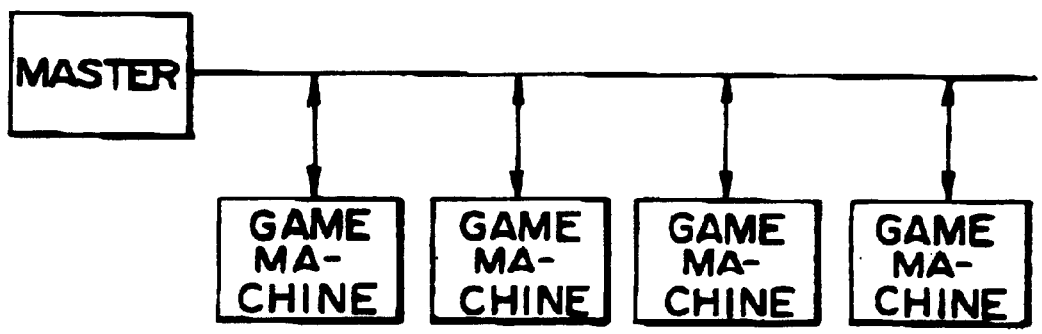

Various different connection states of the game machines could be considered, such as a ring type (topology) as shown in FIG. 17A, a star type as shown in FIG. 17B, or a bus type as shown in FIG. 17C.

The configuration of the game machine is also not limited to that shown in FIG. 2, and thus it could be implemented in various modifications.

The present invention is not limited to gun-wielding games using handgun-shaped controllers; it could also be applied to various other games (such as combat games, competitive games, sports games, role-playing games, or shooting games).

In addition, the present invention is not limited to arcade game systems; it can be applied to various other game systems such as domestic game systems, simulators, large-scale attractions in which many players can participate, and devices where game terminals are connected to a host by communications lines (in which case, the information storage medium could be a magnetic disk, magnetic tape, or memory within the host machine).

What is claimed is:

1. A multi-player type of game system having a plurality of game machines that correspond to a plurality of players, said players comprising first and second players and being able to play a game together, wherein said game system comprises:

means for accepting a mid-game entry request, said mid-game entry request being requested while one of said first and second players is playing a game in a first game space, and said mid-game entry request asking permission for another player to play said game together within said first game space;

means for creating reconstruction information for reconstructing said first game space;

means for transferring said reconstruction information from one game machine to another game machine; and means for reconstructing said first game space in another game machine, based on said reconstruction information, and for allowing said other player to play said game in the reconstructed game space.

2. The game system as defined in claim 1, wherein said reconstruction information comprises information for specifying a state of an object displayed on a display screen at one game machine.

3. The game system as defined in claim 1, wherein said reconstruction information comprises information for specifying the degree of game progress at one game machine.

4. The game system as defined in claim 2, wherein said reconstruction information comprises information for specifying the degree of game progress at one game machine.

5. The game system as defined in claim 1, wherein said reconstruction information comprises information for specifying the degree of progress of an event at one game machine, said progress of the event being controlled by each game machine.

6. The game system as defined in claim 2, wherein said reconstruction information comprises information for specifying the degree of progress of an event at one game machine, said progress of the event being controlled by each game machine.

7. The game system as defined in claim 3, wherein said reconstruction information comprises information for specifying the degree of progress of an event at one game machine, said progress of the event being controlled by each game machine.

8. The game system as defined in claim 1, wherein said reconstruction information comprises information for specifying a substitute part, when an object is configured of a plurality of parts.

9. The game system as defined in claim 2, wherein said reconstruction information comprises information for specifying a substitute part, when an object is configured of a plurality of parts.

10. The game system as defined in claim 3, wherein said reconstruction information comprises information for specifying a substitute part, when an object is configured of a plurality of parts.

11. The game system as defined in claim 5, wherein said reconstruction information comprises information for specifying a substitute part, when an object is configured of a plurality of parts.

12. An information storage medium used for a multi-player type of game system having a plurality of game machines that correspond to a plurality of players, said players comprising first and second players and being able to play a game together, wherein said information storage medium comprises:

information for accepting a mid-game entry request, said mid-game entry request being requested while one of said first and second players is playing a game in a first game space, and said mid-game entry request asking permission for another player to play said game together within said first game space;

information for creating reconstruction information for reconstructing said first game space;

information for transferring said reconstruction information from one game machine to another game machine; and information for reconstructing said first game space in another game machine, based on said reconstruction information, and for allowing said other player to play said game in the reconstructed game space.

13. The information storage medium as defined in claim 12, wherein said reconstruction information comprises information for specifying a state of an object displayed on a display screen at one game machine.

14. The information storage medium as defined in claim 12, wherein said reconstruction information comprises information for specifying the degree of game progress at one game machine.

15. The information storage medium as defined in claim 12, wherein said reconstruction information comprises information for specifying the degree of progress of an event at one game machine, said progress of the event being controlled by each game machine.

16. The information storage medium as defined in claim 12, wherein said reconstruction information comprises information for specifying a substitute part, when an object is configured of a plurality of parts.

* * * * *